United States Patent
Mager et al.

[11] Patent Number: 6,134,538
[45] Date of Patent: *Oct. 17, 2000

[54] PROCEDURE FOR EQUALIZING DISTORTED DATA SIGNALS

[76] Inventors: Klaus Mager, Löwengrundleweg 7, D-78089, Unterkirnach; Edgar Wursthorn, Friedrichstr. 44, D-78073, Bad Dürrheim, both of Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/431,656

[22] Filed: May 2, 1995

[30] Foreign Application Priority Data

May 5, 1994 [DE] Germany ............................ 44 15 811

[51] Int. Cl.[7] .................................................. G06F 15/18

[52] U.S. Cl. .............................................. 706/25; 706/16

[58] Field of Search ...................... 395/23, 22; 375/229; 706/25, 16

[56] References Cited

U.S. PATENT DOCUMENTS

| | | | |
|---|---|---|---|
| 5,272,656 | 12/1993 | Genereux ............................ | 364/724.19 |
| 5,272,723 | 12/1993 | Kimoto et al. ...................... | 375/232 |
| 5,274,744 | 12/1993 | Yu et al. ............................. | 395/24 |
| 5,283,746 | 2/1994 | Cummings et al. ................. | 364/468 |
| 5,361,327 | 11/1994 | Takahashi .......................... | 706/16 |
| 5,467,428 | 11/1995 | Ulug .................................. | 395/23 |
| 5,524,124 | 6/1996 | Koenig .............................. | 375/229 |

FOREIGN PATENT DOCUMENTS 498574 8/1992 European Pat. Off. ........ G11B 20/22

OTHER PUBLICATIONS

Kechriotis et al., Using Recurrent Neural Networks for adaptive communication channel equalization, IEEE Transaction on Neural Networks vol. 5, lss. 2, pp. 267–278, Mar. 1994.

Al–Mashouq et al., The use of neural nets to combine equalization with decoding, ICASSP–93, pp. 469–472, Apr. 30, 1993.

Wang et al., A novel approach to the speaker identification over telephone networks, ICASSP–93, pp. 407–410, Apr. 30, 1993.

Valdovinos et al., Neural Network techniques applied to channel equalization in indoor radio enviornment, Proceedings: 7th Mediterranean electrotechnical conference, pp. 1139–1142, Apr. 14, 1994.

Peng et al., Performance improvement of neural network equalizers, Signals, systems and computers, 1993 27th Asilomar conference, pp. 396–400, Nov. 3, 1993.

Cid–Seuiro et al., Recurrent radial basis function networks for optimal blind equalization, proceedings of the 1993 IEEE–SP workshop, pp. 562–571, Sep. 9, 1993.

Gibson et al., The application of non–linear structures to the reconstruction of binary signals, IEEE transactions on signal processing, pp. 1877–1884, Aug. 1991.

Kimoto et al., Inverse modeling of dynamical system–network architecture with identification network and adaptation network, 1991 IEEE IJCNN, pp. 566–571, Nov. 21, 1991.

Lo et al., Neural Network channel equalization, IJCNN 1992, pp. 981–986, Jun. 11, 1992.

(List continued on next page.)

Primary Examiner—Hosain T. Alam
Assistant Examiner—Sanjiv Shah
Attorney, Agent, or Firm—Joseph S. Tripoli; Robert D. Shedd; Frederick A. Wein

[57] ABSTRACT

A neural network is provided for equalizing distorted data signals. The data signal to be equalized is coupled via time-delay elements to a group of networks for weighting. The output signals of the networks for weighting are coupled to the input terminals of a plurality of neurons whose outputs are coupled, via a respective amplifier, to input terminals of a further neuron having an output terminals where the equalized data signal can be tapped.

2 Claims, 2 Drawing Sheets

OTHER PUBLICATIONS

P. Lee; Neural Net Equalization for a Magnetic Recording Channel IEEE Computer Society Press, Nov. 1, 1993, pp. 369–374.

Nair et al.; Nonlinear Equalization for Data Storage Channels, IEEE Communications Socity, May 1, 1994, pp. 250–254.

G. Gibson et al.; Multilayer Perceptron Structures Applied to Adaptive Equalisers for Data Communications, IEEE, May 23, 1989 pp. 1183–1186.

L. Holmstrom; Using Additive Noise in Back–Propagation Training, IEEE Transactions on Eural Networks, Jan. 1, 1992, pp. 24–38.

M. Caudill; Neural Network Training Tips and Techniques; A1 Expert, Jan. 1, 1991, pp. 56–61.

K. Mager; Einsatz Neuronaler Netze Zur Tekonstruktion von Verzerrten Digitalsignalen, Fernseh–Und Kino–Technik, Aug. 1994, pp. 357–363.

Search Report, EPO, Mar. 13, 1996.

PROCEDURE FOR EQUALIZING DISTORTED DATA SIGNALS

FIELD OF THE INVENTION

The invention relates to a procedure for equalizing distorted data signals.

BACKGROUND

It is known to equalize distorted data signals by means of linear filters.

The data signal recorded on a magnetic tape is shown in FIG. 1.

FIG. 2 shows the playback signal read from the magnetic tape.

It is clearly to be seen that the steepness of the edges in strongly distorted. An already mentioned, linear filters are provided for equalizing data signals. However, given rising data densities it is increasingly becoming more difficult to realize the equalization of magnetically recorded data signals by means of linear filters.

It is therefore the object of the invention substantially to improve the equalization of distorted data signals, in particular magnetically recorded data signals.

The invention achieves this object by providing a neural network for equalizing distorted data signals.

The advantages of a neural network instead of linear filters in the equalization of distorted data signals is now explained using the example of a magnetically recorded data signal.

The invention proceeds from the finding that in the case of a magnetic tape channel it is less a question of a causal transmission system, as is desirable for a linear filter design, than of an acausal system.

The recording and later replaying of data represents a two-stage procedure. Owing to a non-punctiform magnetization and to the stray fields, which can far exceed the wavelengths of the high signal frequencies, when recording an effect is achieved not only at the band position which is just current, but also in the case of events situated previously in time, that is to say in the came of already recorded events. The result of this is that during playback an event which is just current is influenced by successive "future" events, so that it is no longer possible to speak of a causal transmission system in the true sense. The temporal sequence of cause and effect no longer obtains. It is clearly to be seen in FIG. 2 that the playback signal is already rising clearly before the edge to be seen in the record signal risen. The use of linear filters in acausal systems is, however, restricted and leads to an unsatisfactory equalization of distorted data signals. The use of all-pass filters, which can be set only with difficulty, is frequently required.

The invention proceeds from the idea of regarding the playback signal as actual value and the digital record signal as desired value. The neural network does not carry out filtering, but compares the signal pattern of the record signal with signal patterns of the playback signal. Instead of filtering signals by means of linear filters, the invention compares signal patterns.

The theory of neural networks is based on findings which were obtained in the biological and neurological research from investigations on nerve fibers. The conversion of these findings into technology goes back in wide fields to the work of D. O. Habb in 1961. The following three features are essentially concerned with here: neurons communicate with one another over so-called synapses, which are to be regarded as switching points via which a signal of a specific intensity in led to the centre of a cell.

All incoming weighted signals are summed in the cell and a non-linear activation function is applied to them in order to generate the output signal of the neuron which, in turn, is relayed via synapses to other neurons. The essential characteristic of the nerve cells in the brain is their learning ability. It is assumed that the learning process in performed by setting the weightings between the neurons.

These three quoted characteristics of a biological neural network can be transferred to digital and analog electric circuits.

DETAILED DESCRIPTION OF THE PREFERRED EMBODIMENT

The invention will now be explained with the aid of the exemplary embodiment shown in FIG. 3.

Figure 3:
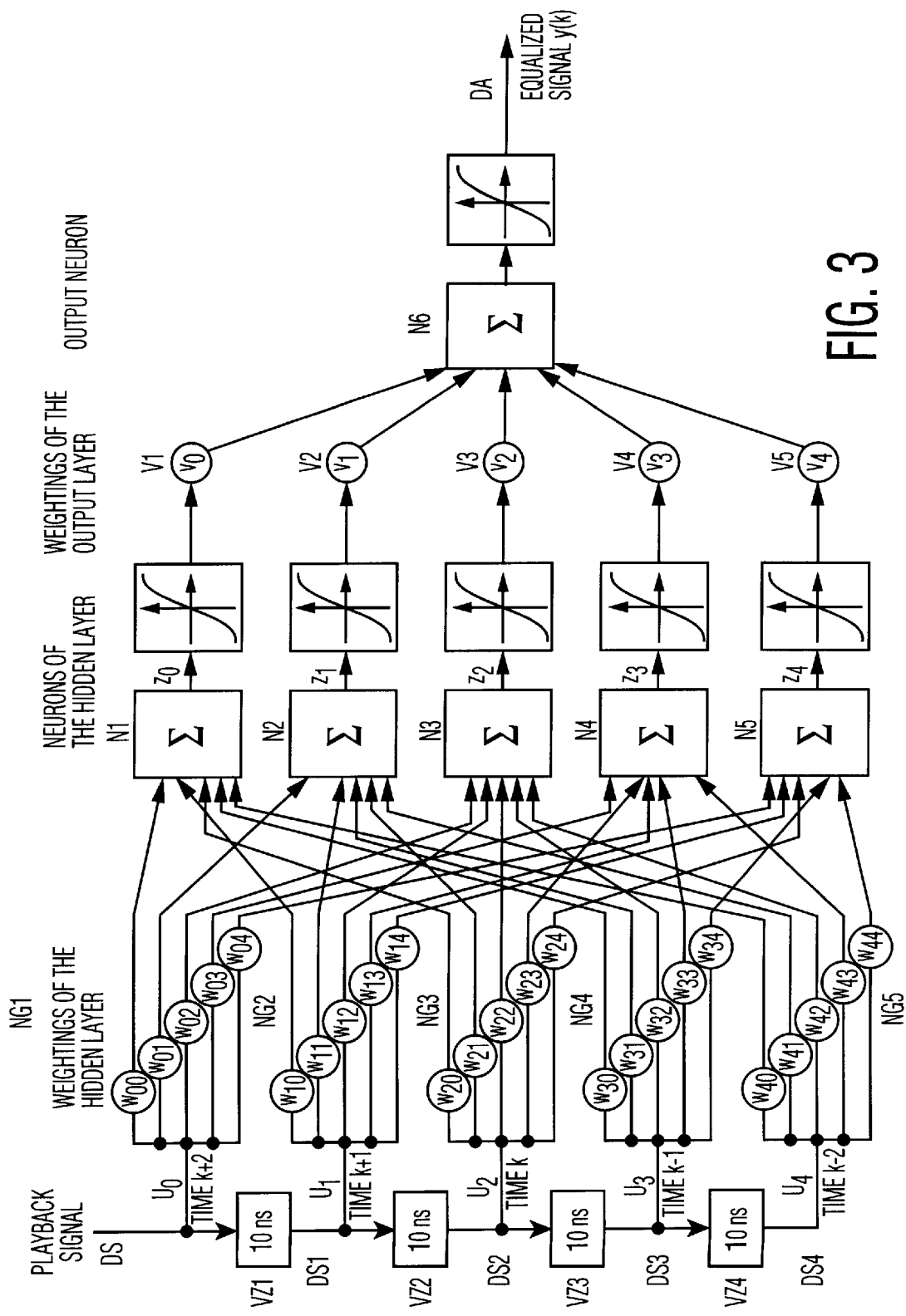
FIG. 3 shows a exemplary embodiment of the invention.

In FIG. 3, the data signal DS to be equalized, which is, for example, read from a magnetic tape, is fed to a series circuit composed of four time-delay elements VZ1 to VZ4. The undelayed data signal DS is fed to the inputs of a first network for weighting by means of the weighting factors w00, w01, w02, w03 and w04. Likewise, the delayed data signal DS1, which can be tapped at the output of the first time-delay element, is fed to a second network for weighting by means of the weighting factors w10, w11, w12, w13 and w14. The delayed data signal DS2 supplied at the output of the second time-delay element VZ2 is fed to a third network for weighting by means of the weighting factors w20, w21, w22, w23 and w24. Likewise, the delayed data signal DS3 present at the output of the third time-delay element VZ3 is fed to a network for weighting by means of the weighting factors w30, w31, w32, w33 and w34. Finally, the delayed data signal D54 supplied by the fourth time-delay element VZ4 is further fed to a further network for weighting by means of the weighting factors w40, w41, w42, w43 and w44.

The first output of each network for weighting is connected to one input each of a neuron N1 to N5 Likewise, the remaining outputs of the network for weighting are connected to one input each of the neurons N1 to N5. The output of each neuron N1 to N5 is respectively connected to the input of an amplifier V1 to V5. The amplifiers V3 to V5 are used to weight the output signals of the neurons N1 to N5. The outputs of the amplifiers V1 to V5 are connected to the inputs of a further neuron N6 at whose output the equalized data signal DA can be tapped.

A neuron is assembled from a summer and a following non-linear activation function unit.

The use of the neural network is divided into a learning phase and a working phase. In the learning phase, the weightings are subjected to a training process for optimum pattern identification. They are variably settable for this purpose. During the working phase, however, the weightings remain permanently set.

The task of the training algorithm is to convert quickly to an optimum weighting setting without controlling the network into saturation or an only local minimum. A known algorithm in, for example, the error back calculation, frequently also denoted as error back propagation.

In a first step, all the weightings $w_{ij}$ of the network for weighting and $v_j$ of the amplifiers V1 to Vn are initialized randomly with small values. An input vector u can now be fed to each jth neuron as a weighted sum $x_j$.

$$x_j = \sum_{i=0}^{4} w_{ij} * u_1 \qquad (1)$$

or vectorially for all neurons of the hidden layer with $\bar{x}$ an vector of state and W as weighting matrix:

$$\bar{x} = \begin{pmatrix} x_0 \\ x_1 \\ x_2 \\ x_3 \\ x_4 \end{pmatrix} = \begin{pmatrix} w_{00} & w_{10} & w_{20} & w_{30} & w_{40} \\ w_{01} & w_{11} & w_{21} & w_{31} & w_{41} \\ w_{02} & w_{12} & w_{22} & w_{32} & w_{42} \\ w_{03} & w_{13} & w_{23} & w_{33} & w_{43} \\ w_{04} & w_{14} & w_{24} & w_{34} & w_{44} \end{pmatrix} * \begin{pmatrix} u_0 \\ u_1 \\ u_2 \\ u_3 \\ u_4 \end{pmatrix} = W * \bar{u} \qquad (2)$$

The first step is to establish a function for activating the neurons as a nonlinear element of the signal transmission. It is intended to model a type of operating point of the biological neurons. The so-called sigmoidal function is generally used for this purpose:

$$f(x) = \frac{1}{1 + e^{-\lambda * v}} \qquad (3)$$

By selecting a very large $\lambda$, the sigmoidal function approximate a step function. It is now possible for the entire response characteristic of the neural network to be recorded by a formula, y being the output variable and $\bar{v}$ being the vector of the output weightings:

$$y = f\left(\sum_{j=0}^{4} v_j * f(x_j)\right) = f\left(\sum_{j=0}^{4} v_j * f\left(\sum_{i=0}^{4} w_{ij} * u_i\right)\right) \qquad (4)$$

$$y = f(\bar{v}^T * f(W * \bar{u})) \qquad (5)$$

$$y = \frac{1}{1 + e^{-\lambda * \bar{v}^T * f(x)}} \qquad (6)$$

$$y = \frac{1}{1 + e^{-\lambda * \bar{v}^T * \frac{1}{1 + e^{-\lambda * W * \bar{u}}}}} \qquad (7)$$

It is immediately obvious that after the random initialization of the weightings the output variable y deviates considerably from the target variable z upon application of an input pattern $\bar{u}$.

Error=z−y

The calculated error can be used to improve the weighting settings. In order to prevent saturation, the error is additionally weighted by means of a factor which expresses the readiness of y to change as a function of the input sum $$\sum_{j=0}^{4} v_j * f(x_j)$$

of the output neuron.

In formal mathematical terms, this factor is the derivative of the activation function from formula 3, which can be expressed neatly as $f=\lambda \cdot f \cdot (1-f)$. The result is the error:

$$\delta = \lambda * y * (1-y) * (z-y) \qquad (9)$$

which can be fed back. It is possible by using δ to calculate the new $w_{ij}$ and $v_i$ when, in addition, a learning rate η, where 0<η<1, which determines the strength of the feedback, is considered (shown for the (n+1)th iteration step):

$$w_{ij}(n+1) = w_{ij}(n) + \eta \cdot \lambda \cdot f(x_j) \cdot (1-f(x_j)) \cdot \delta \cdot V_j \cdot u_i \qquad (10)$$

error back propagation $$v_j(n+1) = v_j(n) + \eta \cdot \delta \cdot f(x_j). \qquad (11)$$

Figure 1:
FIG. 1 shows a record signal recorded on a magnetic tape.
Figure 2:
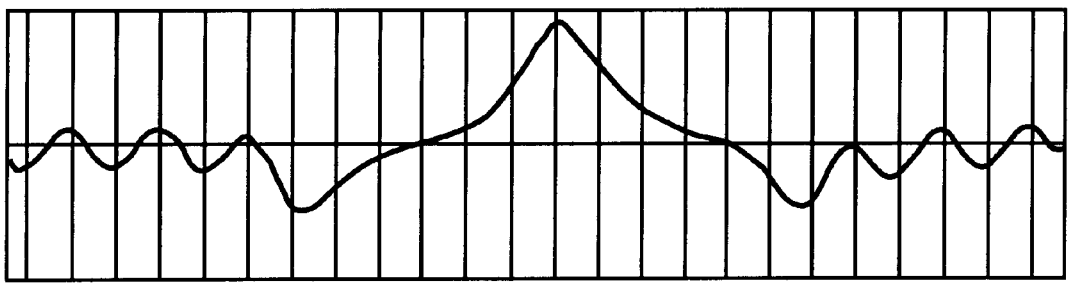
FIG. 2 shows a playback signal from a magnetic tape.

In the training phase, the time window formed by the input vector $\bar{u}$ is repeatedly guided over the entire test sequence from FIG. 1, each pattern being iterated frequently per se.

A comprehensive and easily comprehensible representation of the back propagation algorithm is given in Philip D. Wasen, Neural Computing, Theory and practice, Van Nostrand Reinhold Book, 1989.

The functioning of a neural network in its allotted range of tanks is a function of many parameters.

Very decisive is the way in which the patterns to be learned are presented to the network and trained. A significant cross-section from the system response should be covered by the selection of the patterns. This also includes disturbing influences from practical operation. The aim in training is to control the network into a global minimum of an error function over the multidimensional space of the weightings by suitable selection of the learning rate η and the iteration number per pattern.

The structure of the network, that is to say how many layers and how many neurons it consists of per layer, determines the maximum number of patterns which can be learnt and distinguished. A formal relationship between structure and capacity is presently still unknown. Instead of five input values which follow one another at an interval of 10 ns, more values at a different time interval are also conceivable.

A suitable activation function is to be selected depending on the application. A sinusoidal processing function is proposed in Christian M. Haffer, Worauf es beim Entwerfen neuronaler Netze ankommt [What in important in designing neural networks], Elektronik 6, 1992, for example for a network which is to undertake a Fourier series expansion of its input signal. The sigmoidal function seems to be appropriate in the present application, the gradient of the transition being a further important parameter of the influence exerted.

It can be important for the convergence of the network in the learning phase and its steadiness in the working phase whether the target variable corresponds to the real record signal, that is to say has a finite edge steepness, or whether an ideal step-shaped digital signal is prescribed.

Not least, the initialization of the weightings by means of small random values plays a role, since given the same training a different end state is met up when two random sequences differ in initialization.

When training a neural network, effects are encountered which are also known in biological networks, particularly when the material to be learned is multifarious and extensive. If a specific input pattern is learned by means of too many iterations, the network "forgets" what it has already learned earlier. If the iteration number, however, is too small, only superficial learning takes place which is displaced again by learning other pattern. The aim here is to derive an advantageous training method from experience with simulating the neural network, in order to make optimum use of the available network capacity. A possible strategy is described by the following four steps:

1. Random initialization of the weightings by means of small values.
2. Learning process with a low iteration number and high learning rate. In this process, the network learns the dynamics of the processor present without becoming fixated on a specific pattern.
3. Precision pass with a high iteration number at a low learning rate. Each pattern has the chance of acquiring a niche for itself when the weightings are being configured.
4. Global consideration in a manner similar to the second step with a small iteration number but with a very much lower learning rate, in order to permit fine tuning.

In the last three steps, all the patterns available, that is to say the complete test data sequence, are handled sequentially. In order to reduce the sensitivity of the network with respect to noise, the number of passes of the data sequence can be extended to the effect that learning is performed with and without added noise. In many training passes, the weightings are optimized on the PC and are finally available for setting a hardware item.

The successful use and the acceptance of a neural network often founder on the fact that there is no clarity concerning the processes in the network. The transparency of the network can be increased by considering the sum points of the neurons before the activation function.

If, for example, in the case of a sequence of six high bits the signal at the gum point of the output neuron excessively approaches the zero line, it is to be expected that superimposed noise at this point will cause an erroneous decision.

By adding a noise signal—white noise with a signal-to-noise ratio of –20 dB from the random-check generator of the PC—the signal-to-noise ratio of the network can be substantially improved, because the erroneous decisions then already occur in the learning phase and can be accordingly compensated.

Each of the five sum points of the internal layer represents the output of an FIR filter. The random initialization of the weightings and the subsequent learning process thus produce five FIR filters having a different response characteristic. The weightings $v_1$ of the output layer represent an evaluation of the five filters, after the latter have been decided upon by the activation function. Finally, the activation function of the output neuron corresponds to the discriminator which is also used after each conventional equalizer for detection purposes.

The design of the network in analog circuit engineering is a simple solution for realizing the invention, not least with respect to the required high processing speed. Potentiometers can be used to set the weightings, and the weighted signals are summed at an operational amplifier connected as a summer. In order also to render negative weightings possible, a signal can be tapped at a transistor operated either in the emitter circuit or in the collector circuit. If consideration in limited to step-shaped activation functions, this behaviour is imaged by the use of comparators. It is difficult to realize a sigmoidal activation function, but it could be advantageous both in training and in practice.

The signals can be guided in parallel branches in an analog circuit design and simultaneously processed. This is also the case in biological networks. Computing speed and possible signal bandwidth are therefore very high.

As the measurement results of a very simple circuit show, the use of a neural network for detecting distorted digital signals represents an interesting and promising alternative to the use of linear equalizer components. In contrast with these, a complete reconstruction of the original digital data is within the realm of the possible. Very steep edges, that is to say high frequencies, are recovered exactly, and glitches in low-frequency sequences, one of the weak points of linear equalization, do not occur.

It is advantageous to program the weightings in the hardware directly from the PC, because the setting of the potentiometer by hand is too laborious and inaccurate. Unfortunately, digitally settable potentiometers available on the market have too small a transmission bandwidth (<1 MHz).

Many disturbing influences can be eliminated by differential signal control, as is usual in RF technology.

The realization of the activation faction by means of comparators certainly does not represent the best solution. For one thing, the steep edges of the discriminator disturb the other signals due to cross talk, while for another a soft transition to activation is desirable.

The cross talk between the signal lines can, however, be reduced by matching the signal levels to one another.

During training of a neural network, the long duration of the learning process is onerous in the absence of rapid convergence. The setting achieved is not yet the optimum one.

A starting point in providing a remedy in this connection is the learning rate $\eta$. It could be selected as a function of the network structure and the error just calculated such that the error for the current pattern becomes very small as early as after the second iteration. Such a learning rate control would approximate the dead beat design from automatic control engineering. A faster convergence is thereby possible, because after determination and feedback of the error, the network would be prevented from overshooting, for example due to an excessively large $\eta$, and from producing an error of opposite sign. It is not known how high is the risk of rather encountering a local minimum.

The random initialization of the weighting certainly does not represent the optimum selection of the initial conditions for a network to be trained. If the aim is to permit the weighting vectors to start as differently as possible, they could be subjected, for example, to the Schmidt orthogonalization method and standardized. A further possibility consists in specifically inserting system characteristics as starting values of the weightings. Thus, it is conceivable to initialize each weighting vector to a special frequency inside the possible signal range, by calculating it with the aid of pseudo-inversion of a time series which consists only of the respective frequency, like an FIR filter.

A possibility of adaptation for the network in the working phase could be derived from the abovementioned capacity for self organization in branches of preferred frequencies. The output weightings $v_i$; and thus the frequency weighting could be set depending on the characteristics of a magnetic tape channel.

In addition to equalization by means of a network trained by back propagation, there is another possibility of using neural networks.

A restricted number of codewords exist in the channel code of the digital magnetic tape system, for example having respectively 10 bits, which in turn consist of an only limited number of permissible run lengths, for example between 1 and 6 bits. It is now conceivable to assemble a network in the form of an associative memory whose input weighting vectors consist in binary fashion of the codewords of the channel. After a possible prefiltering of the playback signal, what is first required is to find the start of a codeword. If the latter is then passed to the associative memory, it is to be expected that it will be best correlated with that weighting vector which represents the original digital codeword. The best correlation is specified by the largest scalar product which the input vector achieves with one of the weighting vectors. In the ideal case, it corresponds to the square of the weighting vector.

Differentiation can be undertaken, for example, as prefiltering of the playback signal. Since, to a first approximation, a differentiating behaviour already obtains in the channel, a phase angle of −180° between the record and playback signal could be achieved by a further differentiation, and thus a maximum negative correlation.

The practical realization of an associative memory for the present problem does appear very interesting, but could founder on the required high processing speed, since the "associations" have to be formed with the aid of many multiplications. A network realized in an analog design and whose weightings are optimized using the back propagation algorithm on the PC and are set using potentiometers is, by contrast, very fact and represents a low outlay.

What is claimed is:

1. A method for equalizing data signals applied to a neural network wherein the neural network compares in a working phase, the signal pattern of a distorted signal with known pattern of undistorted signals, wherein:

the neural network is constructed as an associative memory to which an input vector of a data channel is fed in, that scalar products of the input vector with weighting vectors programmed in the associative memory are formed, and in that as an output vector, the weighting vector is selected which gives the largest scalar product with the input vector, wherein, the largest scalar product which the input vector achieves with one of the weighting vector corresponds to the square of the weighting vector.

2. A method according to claim 1 wherein:

said data signals comprise a channel code having only a limited number of permissible run lengths, and said weighting vectors programmed in said associative memory consist in binary fashion of the codewords of the channel code.

* * * * *